(12) United States Patent
White et al.

(10) Patent No.: US 9,661,882 B2
(45) Date of Patent: May 30, 2017

(54) METHOD, SYSTEM, AND APPARATUS FOR INCREASING THE VISIBILITY OF CLOTHING

(71) Applicant: Avery Dennison Retail Information Services, LLC, Mentor, OH (US)

(72) Inventors: Jeremy W. White, Kettering (GB); John Ellison, Essex (GB)

(73) Assignee: AVERY DENNISON RETAIL INFORMATION SERVICES, LLC, Westborough, MA (US)

( * ) Notice: Subject to any disclaimer, the term of this patent is extended or adjusted under 35 U.S.C. 154(b) by 0 days.

(21) Appl. No.: 14/806,171

(22) Filed: Jul. 22, 2015

(65) Prior Publication Data

US 2016/0021946 A1    Jan. 28, 2016

Related U.S. Application Data

(60) Provisional application No. 62/027,891, filed on Jul. 23, 2014.

(51) Int. Cl.
| | |
|---|---|
| *G02B 5/124* | (2006.01) |
| *A41D 13/01* | (2006.01) |
| *B44C 1/17* | (2006.01) |
| *G02B 5/128* | (2006.01) |
| *G02B 5/132* | (2006.01) |

(52) U.S. Cl.
CPC ............ *A41D 13/01* (2013.01); *B44C 1/1712* (2013.01); *G02B 5/128* (2013.01); *G02B 5/132* (2013.01)

(58) Field of Classification Search
CPC .......... G02B 5/12; G02B 5/122; G02B 5/124; G02B 5/128; G02B 5/132; B44F 1/02; B44C 1/1712; A41D 1/04; A41D 13/01; A41D 31/0088; A41D 2400/70
USPC ........ 359/518–520, 529–545; 2/69; 362/103, 362/297
See application file for complete search history.

(56) References Cited

U.S. PATENT DOCUMENTS

| | | | |
|---|---|---|---|
| 4,401,494 | A | 8/1983 | Pernicano et al. |
| 5,244,524 | A | 9/1993 | Yamane |
| 5,588,156 | A | 12/1996 | Panton, Jr. |
| 2003/0150043 | A1 | 8/2003 | Koppers |
| 2010/0232143 | A1* | 9/2010 | Burrows ................ A41D 13/01 362/103 |

OTHER PUBLICATIONS

International Search Report and Written Opinion prepared for PCT/US2015/041556 dated Oct. 13, 2015.

* cited by examiner

*Primary Examiner* — James Phan
(74) *Attorney, Agent, or Firm* — Avery Dennison Retail Information Services, LLC

(57) ABSTRACT

In one exemplary embodiment, a system, method and apparatus for increasing the visibility of a garment or article of clothing may be described. This can include an element of a garment which may be functionally or structurally integrated into the garment, such as a heat transfer. The heat transfer can utilize any number of visibility-enhancing elements to increase the visibility of a wearer of a garment having the heat transfer, for example through any combination of reflective elements, retro-reflective elements, and elements formed in various colors.

15 Claims, 6 Drawing Sheets

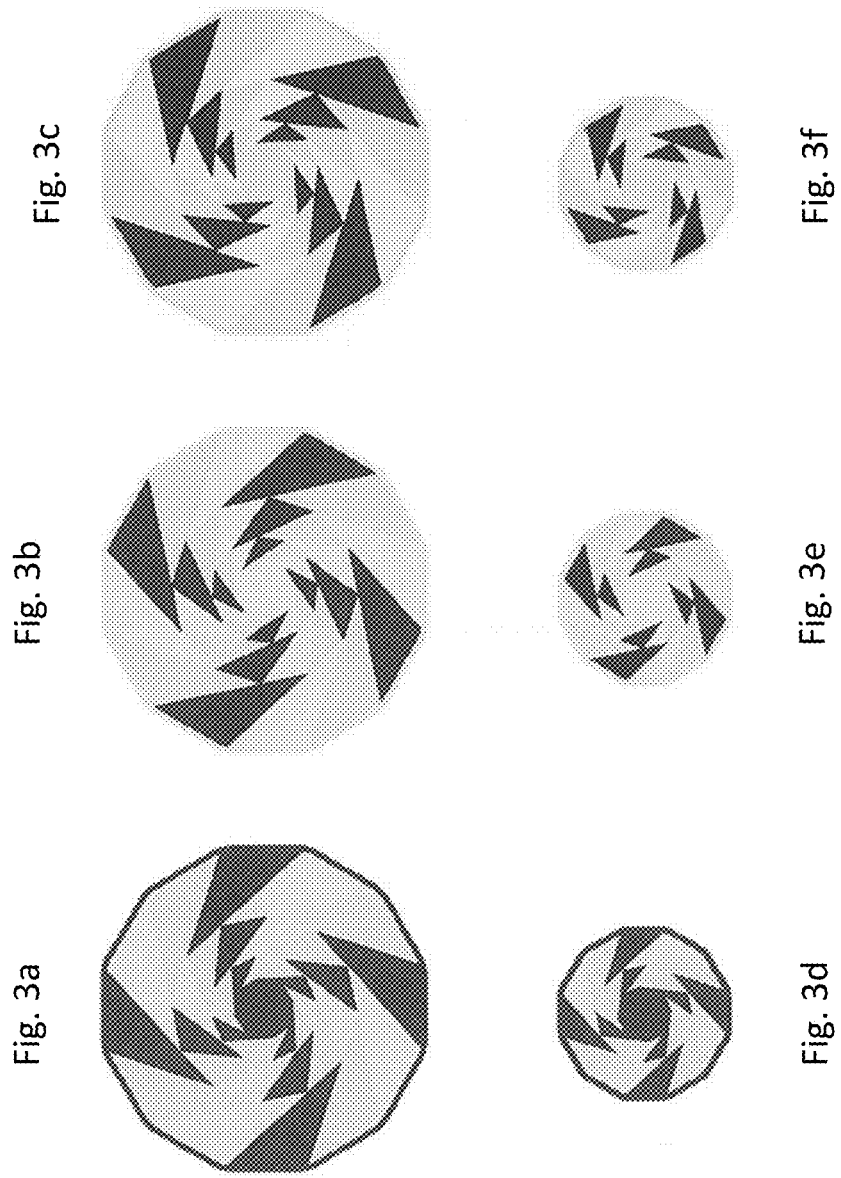

METHOD, SYSTEM, AND APPARATUS FOR INCREASING THE VISIBILITY OF CLOTHING

CROSS-REFERENCE TO RELATED APPLICATION

The present application claims priority from U.S. Provisional Application No. 62/027,891 filed Jul. 23, 2014, which is incorporated by herein by reference in its entirety.

BACKGROUND

The present invention is found in the field of performance apparel or safety garments. People who perform various types of exercise activities, such as running and bicycling, often do so in conditions where light or visibility is not abundant and where there is some risk of injury. For example, in many locations, it is common to see individuals jogging or bicycling on streets that are used primarily to accommodate automobile traffic.

Such forms of exercise often take place during hours of the day when ambient light is not optimal, including before and around sunrise, and before and after sunset each day. As such, people engaging in these activities need to be properly attired for both the exercise they are performing as well as in a manner that can increase or enhance their visibility.

In addition, certain professions may require individuals to work in low light conditions such as crossing guards, police and fire fighters, construction and maintenance workers and the like.

SUMMARY

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

In one exemplary embodiment, a system, method and apparatus for increasing the visibility of a garment or article of clothing may be described. This can include an element of a garment which may be functionally or structurally integrated into the garment, such as a heat transfer. The heat transfer can utilize any number of visibility-enhancing elements to increase the visibility of a wearer of a garment having the heat transfer, for example through any combination of reflective elements, retro-reflective elements, and elements formed in various colors.

In another exemplary embodiment, a heat transfer label is provided and includes at least one black matte finish section and at least one retroflective section, and at least one fluorescent section such that the sections are in juxtaposition to another and together the sections provide high visibility under different lighting conditions.

Other features and advantages of the present invention will become apparent to those skilled in the art from the following detailed description. It is to be understood, however, that the detailed description of the various embodiments and specific examples, while indicating preferred and other embodiments of the present invention, are given by way of illustration and not limitation. Many changes and modifications within the scope of the present invention may be made without departing from the spirit thereof, and the invention includes all such modifications.

BRIEF DESCRIPTION OF THE FIGURES

Advantages of embodiments of the present invention will be apparent from the following detailed description of the exemplary embodiments. The following detailed description should be considered in conjunction with the accompanying figures.

FIGS. 3a-f show further exemplary views of heat transfer that can improve clothing visibility;

DETAILED DESCRIPTION

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiment are not necessarily to be construed as preferred or advantageous over other embodiments. Moreover, the terms "embodiments of the invention", "embodiments" or "invention" do not require that all embodiments of the invention include the discussed feature, advantage or mode of operation.

According to at least one exemplary embodiment, a method, system, and apparatus for improving the visibility of clothing and people may be described.

Figure 2A:
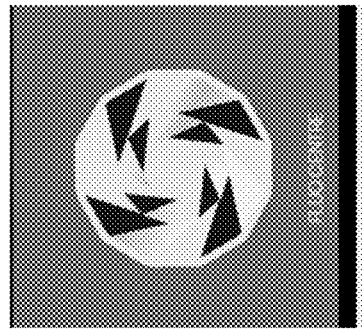
FIGS. 2a-c show further exemplary views of heat transfer that can improve clothing visibility.
Figure 2B:
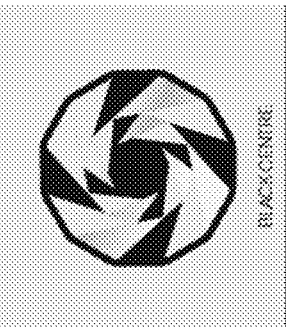
Figure 2C:
Figure 1:
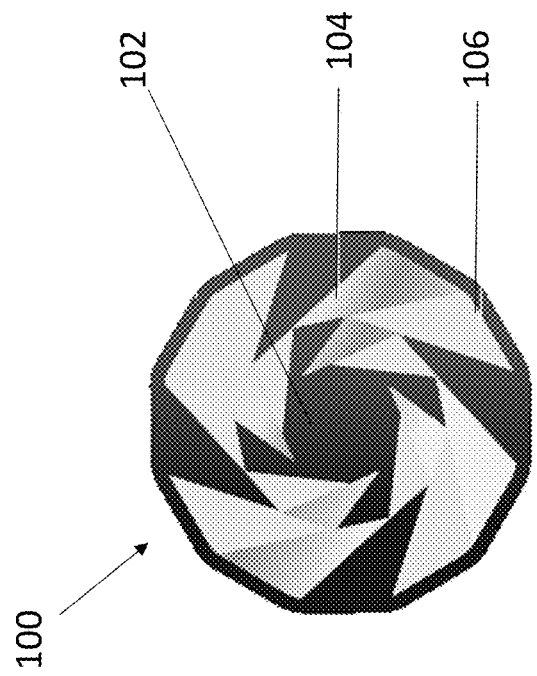
FIG. 1 shows an exemplary view of a heat transfer that can improve clothing visibility.
Figure 5:
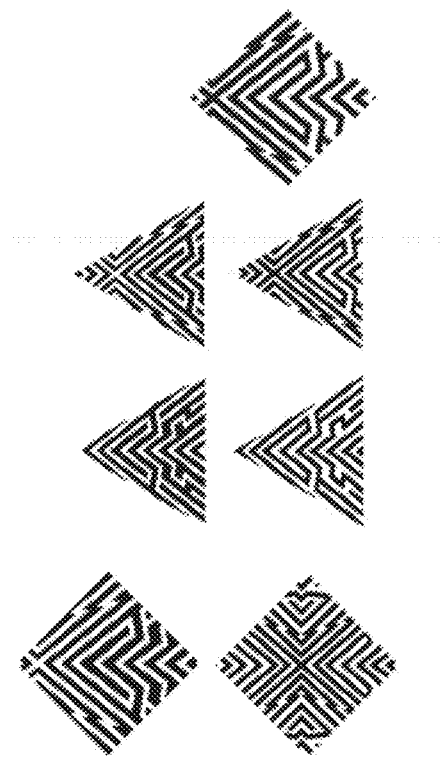
FIG. 5 is an exemplary view of multiple heat transfers in alternative designs.

FIG. 1 may show an exemplary embodiment of a heat transfer 100 that may be used to improve visibility of clothing, garments, jewelry, and/or other articles that may be worn. Such articles may be, but are not limited to, articles worn during exercise activities, exercise apparel, wearable exercise technology such as GPS devices or a music streaming device, and the like. In addition, such heat transfers may also be used in connection with activities performed by safety and security personnel in order to make them more visible such as when directing traffic or making street repairs or the like. Heat transfers as the type described herein are available from Avery Dennison Retail Branding and Information Services of Westborough, Mass.

The heat transfer 100 may be such that it can be applied to an article of clothing, apparel accessory, e.g. hat, regardless of the material or materials used for the article of clothing or accessory. The heat transfer 100 may be substantially durable insofar as it may remain coupled to the article of clothing or accessory during any wear or subsequent washing as well as through a variety of weather environments and conditions, for example throughout the useful life of the article of clothing.

Still referring to exemplary FIG. 1, the heat transfer 100 may include a number of sections formed in various manners so as to increase the visibility of an article of clothing on which a heat transfer 100 is coupled, adhered or applied. Various combinations of materials having different types of visible or reflective properties may be utilized to provide increased visibility to a wearer of heat transfer 100. For example, section 102 may be formed with a matte black appearance. Section 102, other any other section or element of heat transfer 100, can be formed as a substantial base layer of heat transfer 100 or may be formed on top of or in conjunction with any other layers of sections of heat transfer 100. It is contemplated as illustrated in FIG. 1 of the present invention, the plurality of sections are in juxtaposition to one another in any type of geometrical shape. The present invention also contemplates that the heat transfer 100 may comprise a plurality of layers such that each layer has a plurality of sections. Section 102 may be formed with a finish such as matte black or appearance as this may provide for high degree of visibility under certain lighting conditions. For example, if matte black is shown in a dark environment that is illuminated with sodium lights (such as common street lights that provide a yellow hue), matte black, and matte black section 102 may provide a greater degree of visibility or contrast with the ambient environment than other colors. Thus, in such environments, section 102 may provide a more conspicuous contrast and greater visibility than other colors or reflective materials or elements. The present invention contemplates that the dark finish may be a wide variety of colors and finishes such as matte or glossy.

Figure 7:
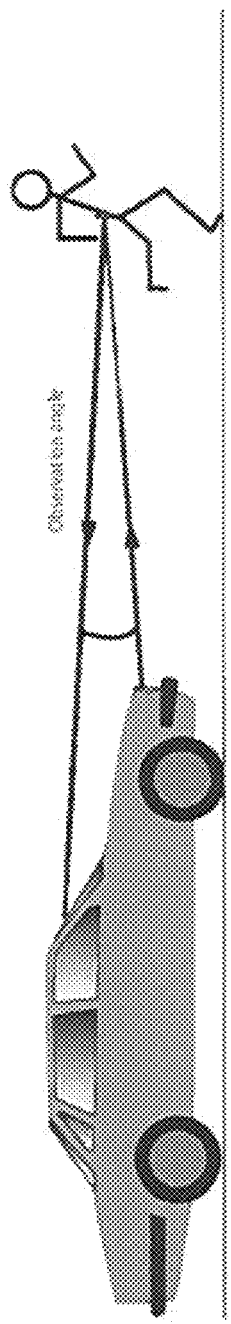
FIG. 7 is an exemplary view of an observation angle of a driver of a car with a person in front of the car.
Figures 8A, 8B, 8C, 8D:
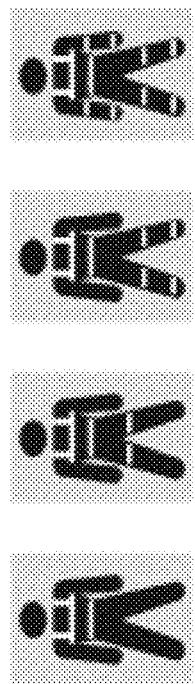
FIGS. 8a-d provide exemplary views of locations on a body or clothing where visibility-increasing heat transfers could be applied.
Figure 9:
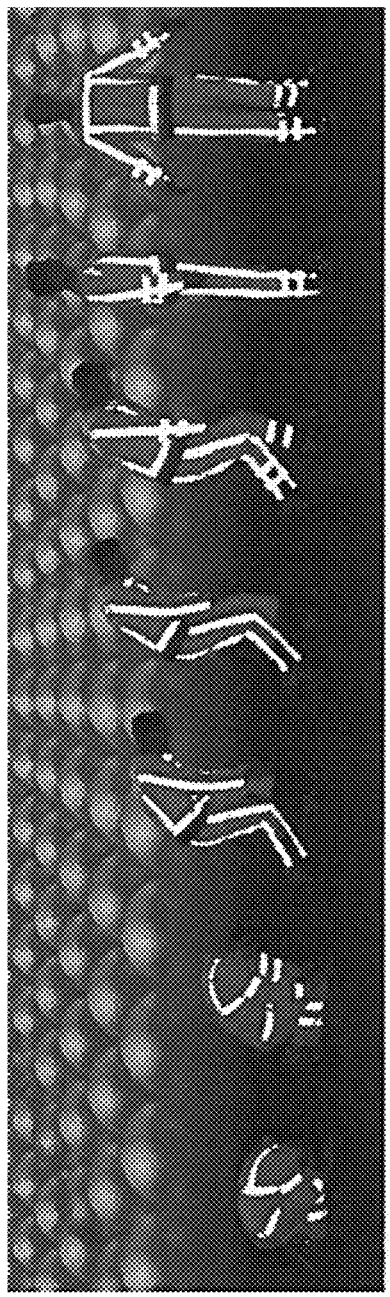
FIG. 9 is an exemplary view of retro-reflective materials applied in various locations on clothing.
Figure 10:
FIG. 10 is an exemplary view of retro-reflective materials applied in various locations on clothing from the perspective of an automobile driver at night.

Section 104 of exemplary FIG. 1 may be a retroflector or be formed with retro-reflective materials. The retro-reflective material may include reflective glass beads or prismatic or microprismatic structures that can improve the reflectivity of incoming light. Suitable glass or microbeads or prismatic or microprismatic structures are available from Avery Dennison Corporation, through the Reflective Products division in Niles, Ill. The retro-reflective materials of section 104 may return light back to a light source, such as automobile headlamps, along the same light direction or substantially the same direction as provided by the light source. Thus, section 104 of heat transfer 100 can provide a high degree of visibility in common environments encountered during exercise or during conducting safety or other maintenance related activities, such as streets in low or lower light situations. An exemplary diagram showing an observation angle of an automobile with respect to a person on the road may be shown in FIG. 7. Further, exemplary views of locations where heat transfer 100 may be used can be shown in FIGS. 8*a*-8*d*. Exemplary FIGS. 9 and 10 can then show how light may be reflected off of retro-reflective materials to increase the visibility of a person at night, when illuminated by automobile (or other) lights. It may further be appreciated, however, that the locations of materials shown in FIGS. 8*a*-8*d* may be utilized for the placement of heat transfers 100 so as to take advantage of increased visibility and sensory awareness associated with the observation of bio-motion. This is described in more detail below.

Still referring to exemplary FIG. 1, section 106 of heat transfer 100 may be formed out of a fluorescent material or elements. Fluorescent colors are known to provide high visibility or contrast under a variety of lighting conditions. Thus, section 106 may provide high visibility, contrast, and recognizability under a variety of diverse lighting situations, such as low light situations. Fluorescent colors are known to provide high visibility or contrast under a variety of lighting conditions.

In one embodiment, the heat transfer 100 includes a reflective section made of reflective materials. Exemplary materials include prismatic or microprismatic structures, glass or microbead or other particulate materials which have reflective or retroreflective properties. The reflective section can be made by adding the reflective materials, such as glass beads directly to the surface such as with an adhesive coating or alternatively the reflective materials can be added by adhering or otherwise affixing the layer to the substrate. Exemplary products are sold under the trademarks OmniView® and OmniCube® and are available from Avery Dennison Corporation.

Heat transfer 100 can therefore be formed of a combination of highly visible, high contrast, and/or highly reflective or retro-reflective elements which can work together to provide high visibility in a variety of typically encountered lighting situations and environments. Further, it may be appreciated that heat transfer 100 may be coupled, adhered or otherwise affixed or applied to an article of clothing in any desired location. For example, it may be desirable to couple, affix or place heat transfer 100 in areas of the clothing associated with movement during exercise, for example elbows, knees such as those shown in exemplary FIGS. 8*a*-8*d*. These can include, but are not limited to, arm/shoulder regions, hip regions, and leg/knee/foot regions. During many types of exercise, such as jogging or bicycling, or while conducting other safety or maintenance related activities, these areas can exhibit near constant movement, also known as bio-motion. As bio-motion is known to be very recognizable and help increase situational awareness of drivers, for example, the use of heat transfer 100 on leg and arm areas of clothing can significantly increase the visibility of the wearer to an observer, such as an automobile driver. Exemplary visibility using such placement may be shown in FIG. 9, where a person is wearing visibility increasing clothing while in various body positions and exemplary FIG. 10, where a person is jogging and visibility is increased and the motion of the arms and legs helps increase visibility and awareness. Additionally, heat transfer 100 could further be positioned in a chest and/or back area, which are traditionally stable during many exercise activities. In these positions, a heat transfer 100 may provide further visibility to an observer, as shown in exemplary FIGS. 9 and 10.

Figure 4:
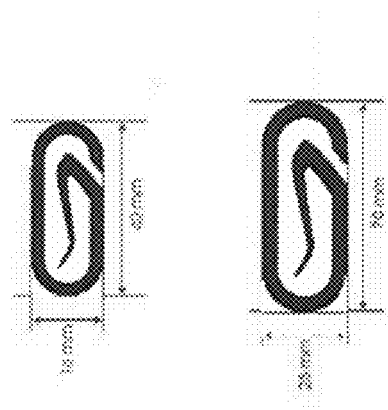
FIG. 4 is an exemplary view of multiple heat transfers in an alternative design with alternative dimensions.
Figure 6:
FIG. 6 is an exemplary view of multiple heat transfers in alternative designs.

Referring back to exemplary FIG. 1, the patterns shown in sections 102 through 106 of heat transfer may be formed in any desired manner and in any sort of geometric shape. In this example, geometric shapes are used in sections 102-106, which can be highly conspicuous and act to capture the attention of an observer. This can provide added visibility and further increase the safety of a wearer. However, it may be appreciated that heat transfer 100 can be formed in any desired shape and size, and sections 102 through 106 may be formed in any shape or size, and having any desired appearance. It can further be appreciated that the amount of the different types of materials in sections 102, 104, and 106 can be varied depending on a desired implementation. For example, different sizes, shapes, orientations, and positions of the heat transfers described herein could be utilized on different types of garments (shirts, shorts, pants, and the like), exercise technology (such as watches, calorie counters, movement trackers, and the like), or any other type of wearable garment or element. Other exemplary appearances of a high visibility heat transfer may be shown herein as well. It may still further be understood that the orientations of matte black section 102, retro-reflective section 104, and fluorescent section 106 may be reversed or otherwise differently arranged on heat transfer 100, as shown in exemplary FIGS. 2a-2c, 3a-3f, 5, and 6. It is appreciated that the heat transfer 100 may have a plurality of these types of sections and may not include a dark section 102, a retro-flective section 104, or a fluorescent section 106. For instance, the present invention contemplates that the heat transfer 100 may contain at least two dark sections 102, a reflective section (not shown) and at least one fluorescent section 106. It is also contemplated that a heat transfer has at least one dark section 102, at least one retro-reflective section and no fluorescent section 106. It may also be appreciated that heat transfer 100 could be formed as a label or logo, or any other form of insignia, for example to indicate branding or to provide additional marketing or promotional themes. Such a stylization of heat transfer 100 could still utilize sections having different elements or capabilities, including having a matte black section, a retro-reflective section, and a fluorescent section. An exemplary view of heat transfer 100 formed as a logo or insignia can be shown in exemplary FIGS. 4a and 4b. In exemplary FIGS. 4a and 4b, it may be appreciated that a heat transfer having the visibility-increasing capabilities as described herein may be formed in any shape or size and having any dimensions, as desired.

The present invention also contemplates the heat transfer 100 may be manufactured in a roll-to-roll manufacturing process. It is also contemplated that the heat transfer 100 is manufactured as a label, such as in a cut sheet configuration, that may be adhered to an article such as a piece of clothing or apparel accessory such as a hat. For instance, the plurality of sections of the heat transfer 100 may be adhered to a layer of adhesive, which in turn may be adhered to a release liner. When it is desired that the heat transfer 100 is adhered or affixed to a substrate, such a piece of clothing, the release liner may be removed and then the heat transfer applied to the item.

The present invention also contemplates that the heat transfer 100 in one embodiment may be permanently adhered to a substrate, such a piece of clothing, or removeably adhered to a substrate. In one embodiment, the heat transfer 100 may be used more than once by a user on a variety of substrates. For instance, an end user my adhere the heat transfer 100 to an athletic piece of clothing and after use remove it from the piece of clothing, such as may be the case in a promotional event where the user or wearer wants to retain a souvenir of the particular event. The user may re-adhere the heat transfer 100 to another substrate such a bike frame. It is also contemplated that the heat transfer is intended to be permanently adhered to a substrate.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A heat transfer label comprising:
   a number of sections including at least one dark section, at least one retro-reflective section, and at least one fluorescent section such that the heat transfer label provides high visibility under a variety of lighting situations.

2. The heat transfer label of claim 1, wherein the label further comprises a layer of adhesive and release liner.

3. The heat transfer label of claim 1, wherein the label further comprises at least one reflective section.

4. The heat transfer label of claim 1, wherein the dark section is a matte black finish.

5. The heat transfer of claim 1, wherein the sections are formed in conjunction with one another.

6. The heat transfer of claim 1, wherein the heat transfer is applied to an area of clothing associated with movement.

7. The heat transfer of claim 1, wherein the label is placed on the chest of a user.

8. The label of claim 1, wherein the retro-reflective section may include glass beads, microbeads, prismatic material or microprismatic structures.

9. A heat transfer label comprising:
   at least one black matte finish section,
   at least one retroflective section, and
   at least one fluorescent section such that the sections are in juxtaposition to another and together provide high visibility under different lighting conditions.

10. The label of claim 9, wherein the label is formed in a roll-to-roll manufacturing process.

11. The label of claim 9, wherein the at least one fluorescent section is formed with fluorescent material.

12. The label of claim 9, wherein the label is permanently adhered with a layer of adhesive to a substrate.

13. The label of claim 12, wherein the substrate is an article of clothing.

14. The label of claim 9, wherein the label is removeably adhered to a substrate.

15. The label of claim 8, wherein the retroreflective section may include glass beads, microbeads, prismatic material or microprismatic structures.

* * * * *